United States Patent
Leu et al.

(10) Patent No.: US 7,255,553 B2
(45) Date of Patent: Aug. 14, 2007

(54) LIGHT GUIDE PLATE MOLD CORE AND METHOD FOR MANUFACTURING THE SAME

(75) Inventors: Charles Leu, Fremont, CA (US); Tai-Cherng Yu, Tu-chen (TW); Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 284 days.

(21) Appl. No.: 10/899,534

(22) Filed: Jul. 26, 2004

(65) Prior Publication Data

US 2005/0019442 A1    Jan. 27, 2005

(30) Foreign Application Priority Data

Jul. 25, 2003   (TW) .............................. 92120350 A

(51) Int. Cl.
*B29C 33/08*   (2006.01)
*B29C 33/76*   (2006.01)

(52) U.S. Cl. ...................... 425/470; 425/468; 425/542; 425/808; 425/414; 425/577; 264/1.34; 264/1.9; 264/2.2; 264/328.1; 264/293; 264/628; 249/134; 249/135; 249/114.1; 249/115

(58) Field of Classification Search ................ 425/470, 425/808; 249/134; 264/1.34
See application file for complete search history.

(56) References Cited

U.S. PATENT DOCUMENTS 5,741,446 A * 4/1998 Tahara et al. ................ 264/1.9
2006/0051453 A1* 3/2006 Imatomi ..................... 425/589

FOREIGN PATENT DOCUMENTS

TW            503170         9/2002

OTHER PUBLICATIONS

English abstract for TW 503,170.*

* cited by examiner

*Primary Examiner*—Yogendra N Gupta
*Assistant Examiner*—Dimple Bodawala
(74) *Attorney, Agent, or Firm*—Wei Te Chung

(57) ABSTRACT

A light guide plate mold core (1) includes a main body (13) having a molding surface (12) and a plurality of concavities (13a) formed at the molding surface. The main body is made of a material whose thermal conductivity is limited in the range from 0.002 cal/cm.s.K. (calories/centimeter.second-.Kelvin) to 0.009 cal/cm.s.K. The thermal conductivity of the material for the light guide plate mold core is less than that of stainless steel. Therefore the rate of spreading of heat in the light guide plate mold core is lower than that of a conventional light guide plate mold core, so that stresses within a formed light guide plate can be released more. Thus by using the light guide plate mold core, a light guide plate having a highly even bottom surface can be manufactured. A method for manufacturing the light guide plate mold core is also provided.

5 Claims, 2 Drawing Sheets

LIGHT GUIDE PLATE MOLD CORE AND METHOD FOR MANUFACTURING THE SAME

BACKGROUND OF THE INVENTION

1. Field of the Invention

The present invention relates to a light guide plate mold core for making a light guide plate used in a liquid crystal display, and a method for manufacturing the light guide plate mold core.

2. Description of the Prior Art

A common type of liquid crystal panel needs a backlight module to provide uniform light and clear viewing of displayed images. A backlight module usually comprises a light source, a light guide plate, and a reflective plate. Light emitted from the light source is directed into the light guide plate, and the light guide plate and the reflective plate guide the light to emit from an emitting surface of the light guide plate. Then the light enters a diffuser, and the diffuser diffuses the light to provide uniform luminance for the liquid crystal panel. Usually, in order to attain uniform emitting light, some special optical structures are disposed on a bottom surface of the light guide plate to disperse light that would otherwise be singly internally reflected. The bottom surface is opposite to the emitting surface, and the optical structures typically are scattering dots.

Nowadays, methods for manufacturing a light guide plate are classified into two types: printing methods and non-printing methods. The printing method typically includes the following steps: printing some printing materials on a bottom surface of a light guide plate substrate, the printing materials being doped with highly diffusive materials such as silicon dioxide ($SiO_2$) and titanium oxide ($TiO_2$); and heating and curing the printed materials. The diffusing materials are used to disperse what would otherwise be single internal reflections of incident light in the light guide plate. That is, the diffusing materials help scatter light before it is transmitted from the emitting surface, thereby providing uniform luminance for a liquid crystal panel.

The non-printing method typically includes the following steps: forming specific patterns on a surface of a light guide plate mold; injecting molten Polymethyl Methacrylate (PMMA) into the mold; and cooling the mold to obtain a light guide plate having corresponding desired specific patterns. The patterns are formed without any heating of a preform of the light guide plate. Thus the non-printing method has the benefit of lower costs.

A light guide plate mold core used in the light guide plate mold has two main functions: forming patterns on the light guide plate so that the light guide plate can attain uniform emitting light from light input from the light source, and controlling the speed of cooling of the molten Polymethyl Methacrylate. Conventional mold cores are made of stainless steel, and the speed of cooling of the molten Polymethyl Methacrylate is so fast that stresses within the formed light guide plate cannot be entirely released. That is, the surface of the light guide plate is liable to be uneven or bent. This reduces the uniformity of reflection and transmission of light within and from the light guide plate. The optical characteristics of the backlight module and thus the liquid crystal display are detrimentally affected.

SUMMARY OF THE INVENTION

A first object of the present invention is to provide a light guide plate mold core which can produce a light guide plate having an even bottom surface.

To achieve the first object, a light guide plate mold core includes a main body having a molding surface and a plurality of concavities formed at the molding surface. The main body is made of a material whose thermal conductivity is limited in the range from 0.002 cal/cm.s.K. (calories/centimeter.second.Kelvin) to 0.009 cal/cm.s.K. The thermal conductivity of the material for the light guide plate mold core is less than that of stainless steel. Therefore the rate of spreading of heat in the light guide plate mold core is lower than that of a conventional light guide plate mold core, so that stresses within a formed light guide plate can be released more. Thus by using the light guide plate mold core, a light guide plate having a highly even bottom surface can be manufactured.

A second object of the present invention is to provide a method for manufacturing the above-described light guide plate mold core.

To achieve the second object, a method for manufacturing the light guide plate mold core includes the following steps: coating a photo resist layer on a substrate; exposing and developing the photo resist layer to form a developed photo resist layer; heating the developed photo resist layer to form a photo resist pattern; electroforming a mold material layer on the substrate and the photo resist pattern, a thermal conductivity of the mold material layer being limited in the range from 0.002 cal/cm.s.K. to 0.009 cal/cm.s.K.; separating the substrate with the photo resist pattern from the mold material layer, thereby obtaining the light guide plate mold core having a molding surface and a plurality of concavities.

Other objects, advantages and novel features of the present invention will be apparent from the following detailed description of preferred embodiments thereof with reference to the attached drawings, in which:

DETAILED DESCRIPTION OF THE PRESENT INVENTION

Figure 1:
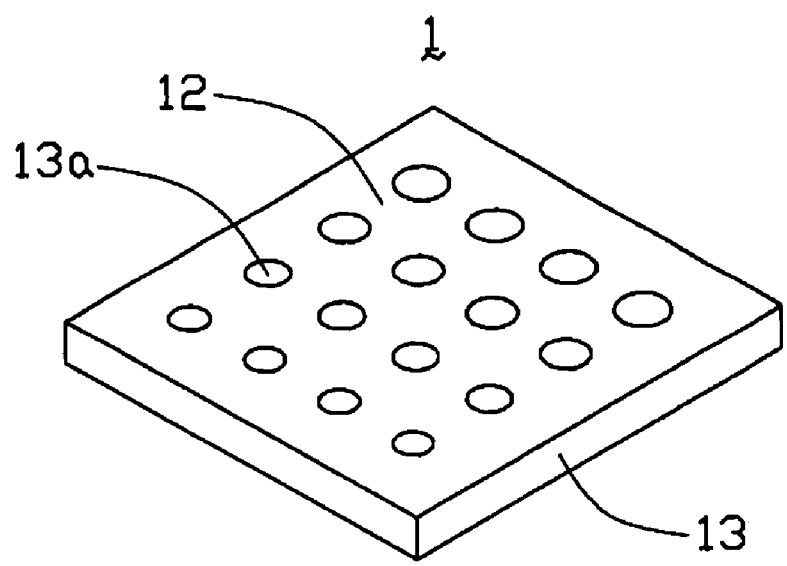
FIG. 1 is a simplified, isometric view of a light guide plate mold core of the present invention.

Referring to FIG. 1, a light guide plate mold core 1 includes a main body 13 having a molding surface 12 and a plurality of concavities 13a formed at the molding surface 12. The main body 13 is essentially a flat board. Alternatively, the main body 13 may be cuneiform. The main body 13 is made of material whose thermal conductivity is limited in the range from 0.002 cal/cm.s.K. (calories/centimeter.second.Kelvin). to 0.009 cal/cm.s.K., such as cordierite or sillimanite. Each concavity 13a may be cylindrical, semi-cylindrical, elliptically cylindrical, cuboid, pyramidal, hemispherical, sub-hemispherical, or dome-shaped. By using the light guide plate mold core 13, a bottom surface of a light guide plate can be manufactured to have a plurality of dots which are cylindrical, semi-cylindrical, elliptically cylindrical, cuboid, pyramidal, hemispherical, sub-hemispherical, or dome-shaped.

Referring to FIGS. 2 to 7, a method for manufacturing the light guide plate mold core 1 includes the following steps:
1) coating a photo resist layer 11 on a substrate 10;
2) exposing and developing the photo resist layer 11 to form a developed photo resist layer 11*a*;
3) heating the developed photo resist layer 11*a* to form a photo resist pattern 11*b*;
4) electroforming a mold material layer 13*b* on the substrate 10 and the photo resist pattern 11*b*; and
5) separating the substrate 10 with the photo resist pattern 11*b* from the mold material layer 13*b*, thereby obtaining the light guide plate mold core 1 having the main body 13, the molding surface 12 and the concavities 13*a*.

Figure 2:
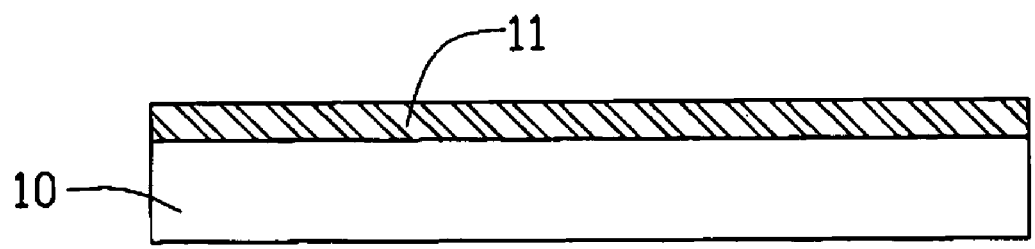
FIG. 2 is a schematic, cross-sectional view of a photo resist layer coated on a substrate according to a first step of a method for manufacturing the light guide plate mold core shown in FIG. 1.

Further details of the above steps are as follows:

Referring to FIG. 2, the substrate 10 is usually made of a metal, such as nickel, which has a high hardness and which is durable. The photo resist layer 11 is evenly coated on the substrate 10. The photo resist layer 11 comprises a positive photo resist. That is, the photo resist layer 11 is photosensitive.

Figure 3:
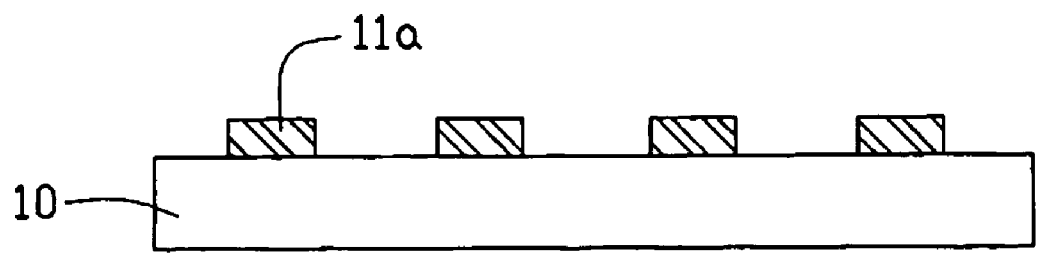
FIG. 3 is similar to FIG. 2, but showing the photo resist layer developed in accordance with the manufacturing method.

Referring to FIG. 3, the photo resist layer 11 is exposed by irradiation beams. The irradiation beams can be laser beams or electron beams. In order to attain different exposure depth levels on the photo resist layer 11, the intensities of the irradiation beams are controlled. After developing the photo resist layer 11, exposed portions of the photo resist layer are washed out, thereby obtaining the developed photo resist layer 11*a*.

Figure 4:
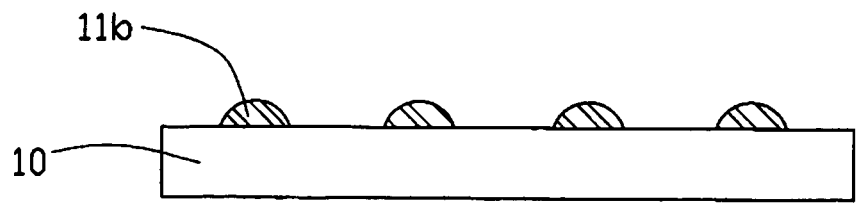
FIG. 4 is similar to FIG. 3, but showing the photo resist layer changed into a photo resist pattern in accordance with the manufacturing method.

Referring to FIG. 4, after the exposing and developing step, the developed photo resist layer 11*a* is heated. By such means, the developed photo resist layer 11*a* can be shaped so that a desired photo resist pattern 11*b* is formed.

Figure 5:
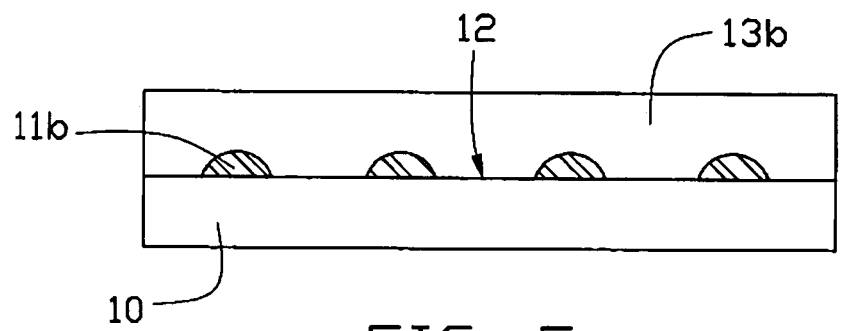
FIG. 5 is similar to FIG. 4, but showing a mold material layer electroformed on the substrate and the photo resist pattern in accordance with the manufacturing method.

Referring to FIG. 5, the mold material layer 13*b* is electroformed on the substrate 10 and the photo resist pattern 11*b*. A thermal conductivity of the mold material layer 13*b* is limited in the range from 0.002 cal/cm.s.K. to 0.009 cal/cm.s.K.

Figure 6:
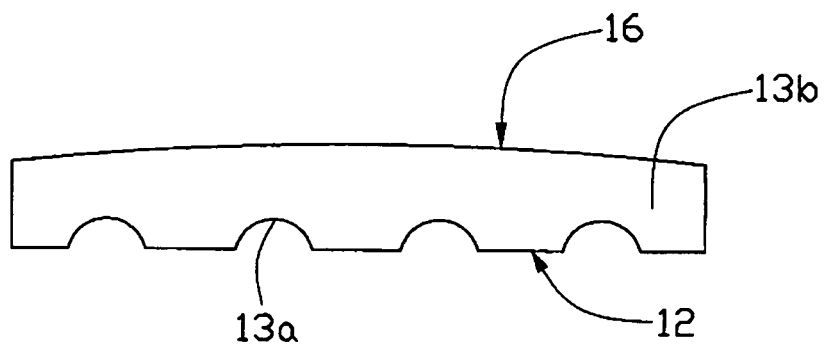
FIG. 6 is similar to FIG. 5, but showing the mold material layer after the substrate with the photo resist pattern have been removed in accordance with the manufacturing method.

Referring to FIG. 6, the substrate 10 with the photo resist pattern 11*b* is separated from the mold material layer 13*b*, thereby obtaining the light guide plate mold core 1. The light guide plate mold core 1 includes the main body 13 having the molding surface 12 and the plurality of the concavities 13*a* formed at the molding surface 12.

Figure 7:
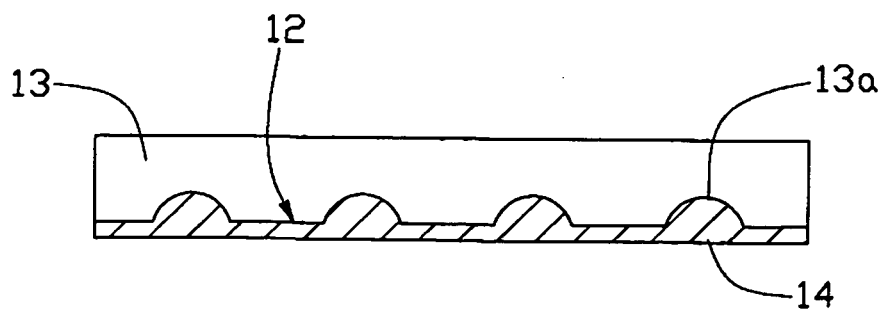
FIG. 7 is similar to FIG. 6, but showing a protection layer coated on the mold material layer, and a bottom surface of the mold material layer rubbed even, in accordance with the manufacturing method.

After performing the above steps, a bottom surface 16 of the light guide plate mold core 1 that is opposite to the molding surface 12 may have become bent or uneven. In order to flatten the bottom surface 16, a rubbing step is generally needed, as detailed below:

Referring to FIG. 7, a protection layer 14 is coated on the molding surface 12 and the concavities 13*a*. The protection layer 14 protects the molding surface 12 and the concavities 13*a* from damage during the rubbing process. The bottom surface 16 is rubbed until it is flat and even. The protection layer 14 is removed, thereby obtaining the finished light guide plate mold core 1 having the even bottom surface 16.

The thermal conductivity of the material for the light guide plate mold core 1 is limited in the range from 0.002 cal/cm.s.K. to 0.009 cal/cm.s.K. That is, the thermal conductivity of the material for the light guide plate mold core 1 is less than that of stainless steel. Therefore the rate of spreading of heat in the light guide plate mold core 1 is lower than that of a conventional light guide plate mold core, so that stresses within a formed light guide plate can be released more. Thus by using the light guide plate mold core 1, a light guide plate having a highly even bottom surface can be manufactured.

While the present invention has been described with reference to particular embodiments, the description is illustrative of the invention and is not to be construed as limiting the invention. Various modifications of the described embodiments can be made by those skilled in the art without departing from the true spirit and scope of the invention as defined by the appended claims.

We claim:

1. A light guide plate mold core, comprising:
   a main body having a molding surface and a plurality of concavities formed at the molding surface,
   wherein the main body is made of a material whose thermal conductivity is limited in the range from 0.002 cal/cm.s.K (calories/centimeter.second.Kelvin) to 0.009 cal/cm.s.K, the material of the main body comprises sillimanite.

2. The light guide plate mold core of claim 1, further comprises the material of main body cordierite.

3. The light guide plate mold core of claim 1, wherein each of the concavities is one of cylindrical, semi-cylindrical, elliptically cylindrical, cuboid, pyramidal, hemispherical, sub-hemispherical, and dome-shaped.

4. The light guide plate mold core of claim 1, wherein the main body is essentially a flat board.

5. The light guide plate mold core of claim 1, wherein the main body is cuneiform.

* * * * *